(12) United States Patent
Heffron et al.

(10) Patent No.: US 6,345,955 B1
(45) Date of Patent: *Feb. 12, 2002

(54) BOWED NOZZLE VANE WITH SELECTIVE TBC

(75) Inventors: Todd S. Heffron, Indian Springs; John P. Heyward, Loveland; John H. Starkweather; Scott M. Carson, both of Cincinnati, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/466,296

(22) Filed: Dec. 17, 1999

Related U.S. Application Data

(62) Division of application No. 09/136,834, filed on Aug. 20, 1998, now Pat. No. 6,077,036.

(51) Int. Cl.[7] ................................................. F01D 5/14
(52) U.S. Cl. ..................... 415/115; 415/191; 415/208.2; 416/241 R
(58) Field of Search .................................. 415/115, 191, 415/208.2, 217.1; 416/241 R, 241 B

(56) References Cited

U.S. PATENT DOCUMENTS

| | | | |
|---|---|---|---|
| 4,056,332 A | 11/1977 | Meloni | 416/97 A |
| 5,328,331 A | 7/1994 | Bunker et al. | 416/96 R |
| 5,342,170 A | 8/1994 | Elvekjaer et al. | 415/192 |
| 5,417,545 A * | 5/1995 | Harrogate | 415/115 |
| 5,525,038 A | 6/1996 | Sharma et al. | 416/238 |
| 5,706,647 A * | 1/1998 | Frey et al. | 60/39.75 |
| 6,077,036 A * | 6/2000 | Feffron et al. | 415/115 |

FOREIGN PATENT DOCUMENTS

| | | |
|---|---|---|
| JP | 63295803 | 12/1988 |
| JP | 7127401 | 5/1995 |
| JP | 7278780 | 10/1995 |

\* cited by examiner

*Primary Examiner*—Edward K. Look
*Assistant Examiner*—Ninh Nguyen
(74) *Attorney, Agent, or Firm*—Andrew C. Hess; William Scott Andes

(57) ABSTRACT

A turbine nozzle includes outer and inner bands between which extend a plurality of vanes for channeling combustion gases. Each of the vanes includes leading and trailing edges, and pressure and suction sides extending therebetween, and also a bow along the trailing edge to increase pressure in the gases adjacent the inner band. The vanes also include a thermal barrier coating (TBC) selectively disposed solely along the suction side between the leading and trailing edges.

10 Claims, 4 Drawing Sheets

BOWED NOZZLE VANE WITH SELECTIVE TBC

This application is a division of Ser. No. 09/136,834 filed Aug. 20, 1998 now U.S. Pat. No. 6,077,036.

BACKGROUND OF THE INVENTION

The present invention relates generally to gas turbine engines, and, more specifically, to high pressure turbine nozzles.

In a typical turbofan aircraft gas turbine engine, air is pressurized in a multistage axial compressor, mixed with fuel in a combustor, and ignited for generating hot combustion gases which flow downstream through a high pressure (HP) turbine nozzle which turns and accelerates the gases for energy extraction therefrom in downstream high pressure turbine rotor blades. The gases then flow through a low pressure turbine which extracts additional energy for powering a fan to produce propulsion thrust for powering the aircraft in flight. The many components disposed in the flowpath of the hot combustion gases are heated thereby and must be suitably protect therefrom.

For example, thermal barrier coating (TBC) is a ceramic material having various conventional compositions which may be applied in thin layers atop the various components for providing thermal protection thereof. The TBC may be conventionally applied using plasma spray techniques or physical vapor deposition.

The TBC provides a barrier between the hot combustion gases and the underlying metal of the specific components and provides thermal insulation for reducing the maximum temperature experienced by the component for improving the useful life thereof in the engine.

Since the TBC is a ceramic material it is also relatively brittle compared to the underlying metal substrate, and therefore, its integrity and corresponding durability is in large part determined by the strength and operating experience of the underlying component. For example, the HP turbine nozzle vanes receive the hottest temperature combustion gases from the combustor and require corresponding protection.

Various configurations of turbine nozzle vanes have enjoyed many years of successful commercial use when protected with TBC. Typical nozzle vanes are radially straight and twist relative to the trailing edges thereof for defining converging channels therebetween ending in throats of minimum flow area through which the combustion gases are turned and accelerated toward the turbine rotor blades.

The TBC may be applied along the suction sides of the vanes as well as along the pressure sides exclusive of the vane throat in conventional practice. The nozzle throat area is a critical design parameter which affects the operating efficiency of the turbine and therefore the entire engine. The individual vane throat areas arid the collective throat area must be maintained within a suitable narrow tolerance for optimum engine efficiency. Since TBC is conventionally applied with a thickness tolerance of plus or minus a few mils, this tolerance variation would be unacceptable in maintaining consistent nozzle throat area, and therefore the TBC is not provided on the suction sides of the vanes near the leading edges which forms one boundary of the vane throat, with the other boundary being defined by the pressure side along the trailing edge of the next adjacent nozzle vane.

In a recent development enjoying successful commercial use in this country for several years, a 3-D nozzle vane includes a trailing edge having a bow instead of being straight for increasing total pressure and momentum in the combustion gases at the root of the vanes near their supporting inner bands. The 3-D vane twists about its leading edge between the inner and outer bands and also leans along the trailing edge to define the bow. Three dimensional computer analysis software is available for defining the specific curvature and extent of the bow to increase gas flow momentum near the inner band for improving the overall efficiency of the turbine and engine.

In order to protect the 3-D bowed vanes against the high temperatures of the combustion gases, the vanes have included full coverage TBC along both their pressure and suction sides exclusive of the vane throats. The application of the TBC to the bowed nozzle vane is even more critical than for straight vanes since differential temperatures commonly occurring over the surfaces of the vane can create corresponding thermal stress and distortion therein. The bowed trailing edge, for example, is now subject to bending loads due to its non-straight configuration, and is therefore also subject to distortion in its curvature. Since the trailing edge defines one boundary of the vane throat, any variation in that boundary changes the throat area which can undesirably decrease the efficiency of the turbine and the engine.

Throat area changes also alter the total pressure drop across the turbine nozzle and correspondingly increase loads in the thrust bearing which reacts the differential loads between the compressor and the turbine rotor.

Several years of commercial experience of the full coverage TBC 3-D bowed turbine nozzle has shown failure in the TBC such as premature spallation along the leading edges of the vanes.

Accordingly, it is desired to eliminate the premature failure of the TBC in the 3-D bowed nozzle vane without adversely affecting aerodynamic performance or efficiency of the nozzle and engine, and obtaining a suitable useful life of the turbine nozzle.

BRIEF SUMMARY OF THE INVENTION

A turbine nozzle includes outer and inner bands between which extend a plurality of vanes for channeling combustion gases. Each of the vanes includes leading and trailing edges, and pressure and suction sides extending therebetween, and also a bow along the trailing edge to increase pressure in the gases adjacent the inner band. The vanes also include a thermal barrier coating (TBC) selectively disposed solely along the suction side between the leading and trailing edges.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
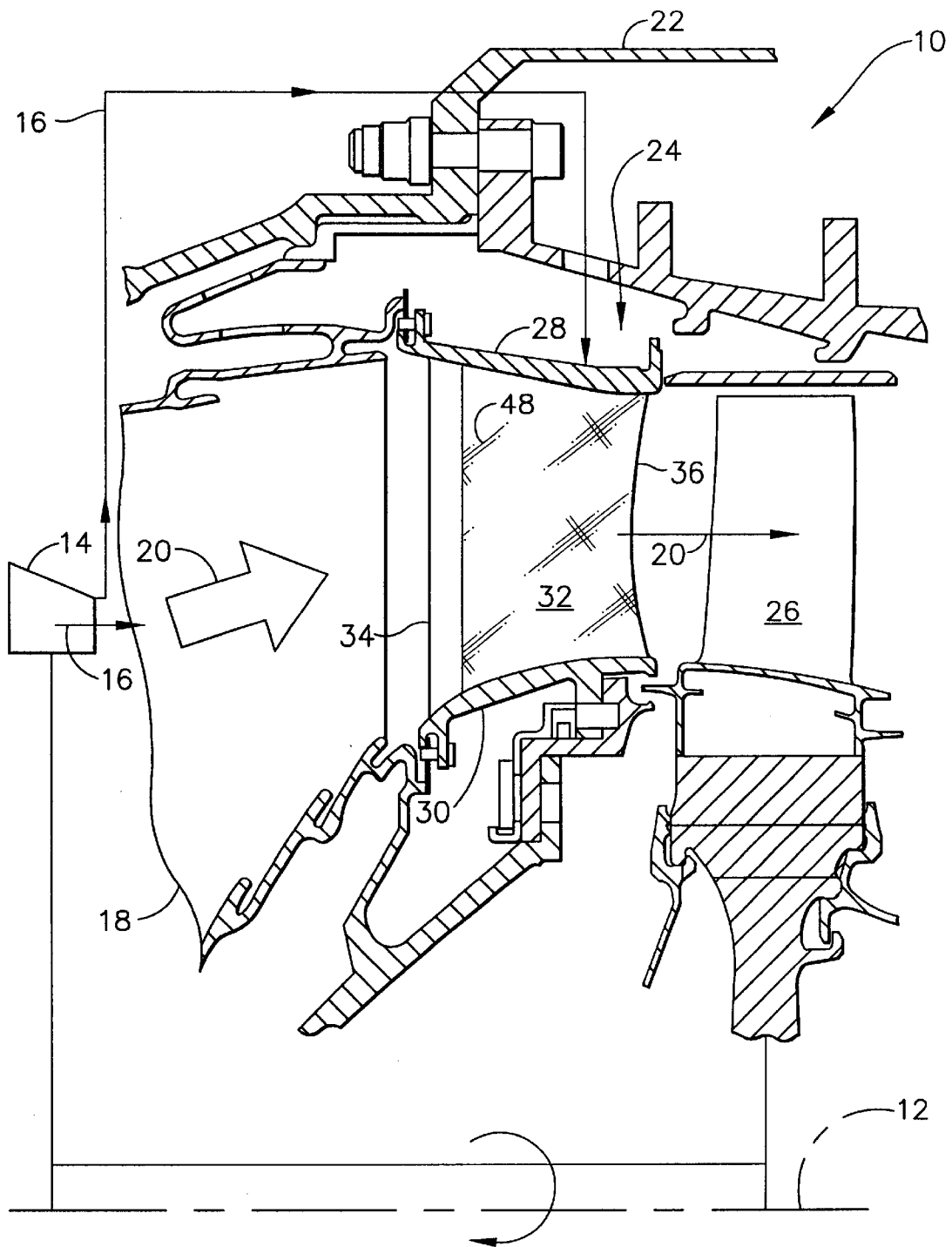
FIG. 1 is an axial sectional view through a portion of a turbofan aircraft gas turbine engine including a high pressure turbine nozzle disposed downstream from a combustor and upstream from a row of turbine rotor blades in accordance with an exemplary embodiment of the present invention.

Illustrated in FIG. 1 is a portion of an aircraft turbofan gas turbine engine 10 which is axisymmetrical about a longitudinal or axial centerline axis 12. The engine includes a fan (not shown) for producing propulsion thrust for powering an aircraft in flight.

Disposed downstream from the fan is a multistage axial compressor 14 for pressurizing air 16, which is then channeled to an annular combustor 18 (only a portion of which is illustrated) wherein it is mixed with fuel and ignited for generating hot combustion gases 20 which flow downstream therefrom.

The combustor is mounted inside an annular casing 22, and disposed directly downstream therefrom is a high pressure (HP) turbine nozzle 24 in accordance with an exemplary embodiment of the present invention. The combustion gases flow downstream through the nozzle 24 to a row of HP turbine rotor blades 26 extending radially outwardly from a supporting rotor disk which in turn is joined to the compressor 14. The turbine blades 26 extract energy from the combustion gases 20 to power the compressor during operation.

The turbine nozzle 24 illustrated in FIG. 1 is an annular assembly of components and is axisymmetrical about the engine centerline axis 12. The nozzle includes an annular radially outer band 28 typically formed in a plurality of circumferentially adjoining arcuate segments. Similarly, the nozzle also includes an annular radially inner band 30 also formed in corresponding arcuate segments. A plurality of hollow vanes 32 extend radially between the outer and inner bands and are fixedly joined thereto typically in a common casting.

Figure 2:
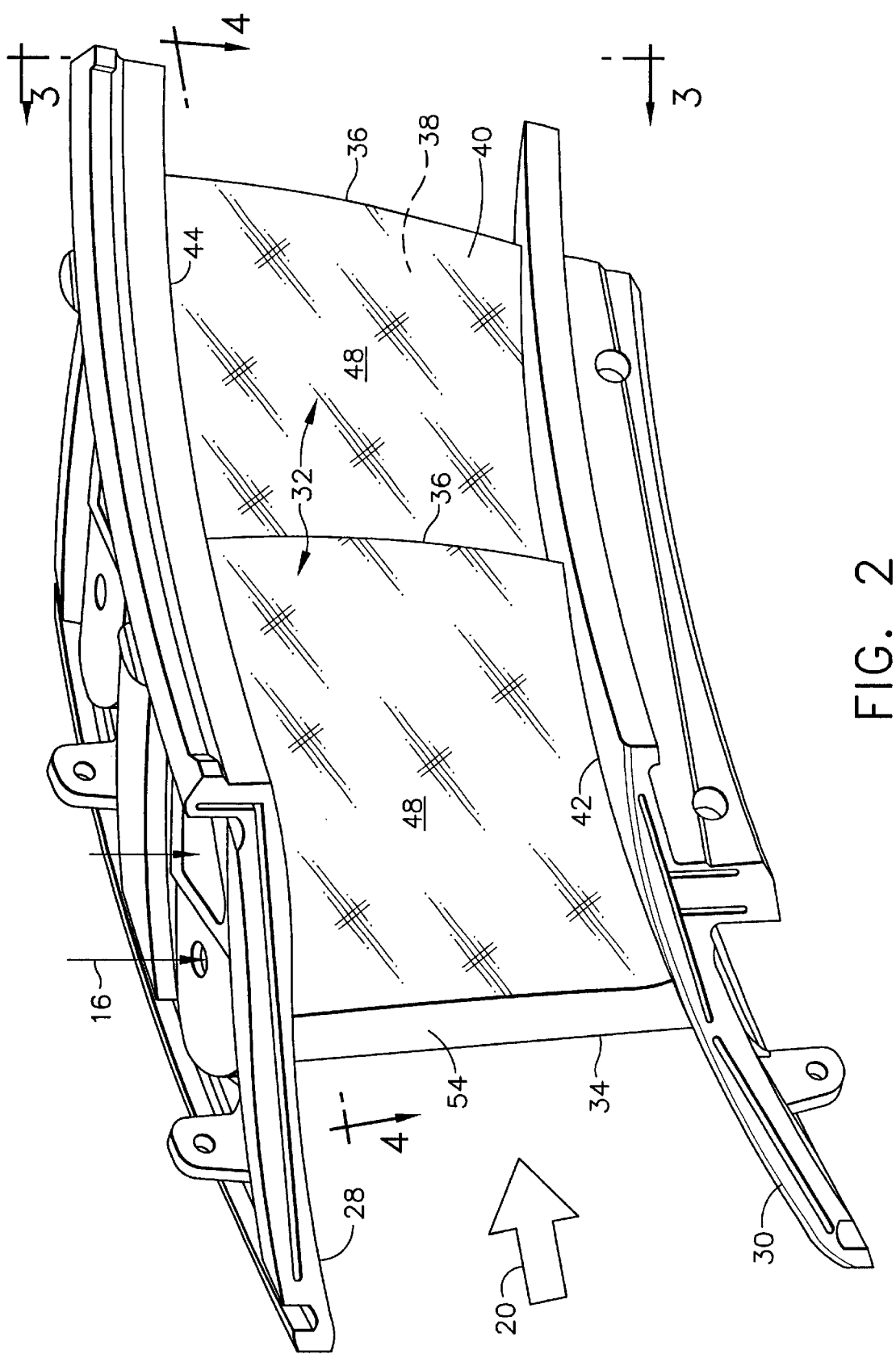
FIG. 2 is an isometric view of a two-vane segment of the HP nozzle illustrated in FIG. 1 showing selectively applied TBC thereon.

As shown in FIG. 2, each nozzle segment may include two circumferentially spaced apart vanes 32, and adjoining nozzle segments are suitably sealed together to form a complete row of the nozzle vanes configured for turning and accelerating the combustion gases toward the row of rotor blades 26 which extract energy therefrom.

Figure 3:
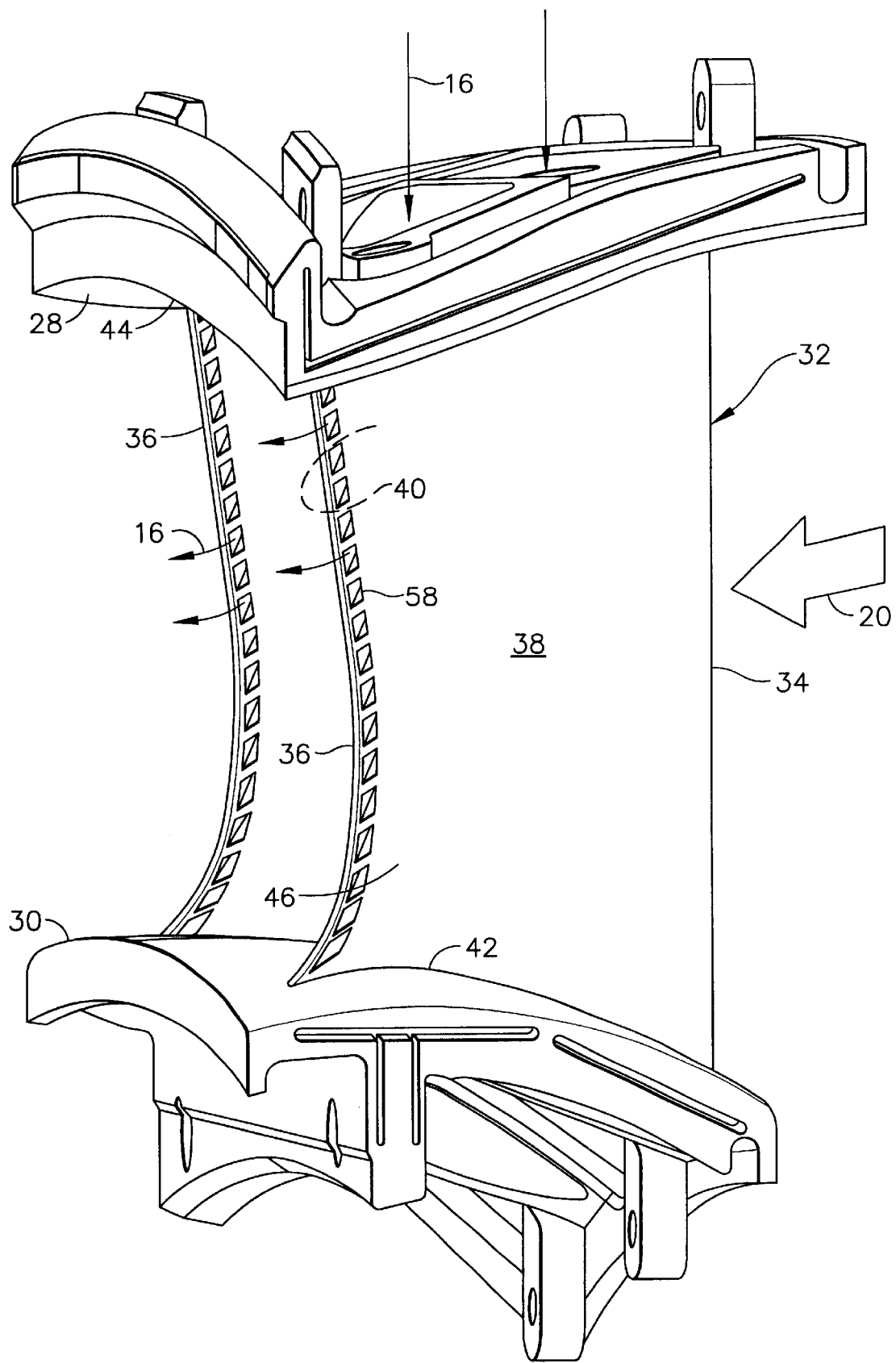
FIG. 3 is an isometric view of the nozzle segment illustrated in FIG. 2 and taken generally along line 3—3.

Referring to both FIGS. 2 and 3, each of the vanes 32 includes axially spaced apart leading and trailing edges 34,36, a generally axially concave pressure side 38, and a circumferentially opposite, generally convex suction side 40 both of which extend axially between the leading and trailing edges. Each vane also includes a root or hub 42 fixedly attached to the inner band 30, and a radially opposite tip 44 fixedly joined to the outer band.

Figure 4:
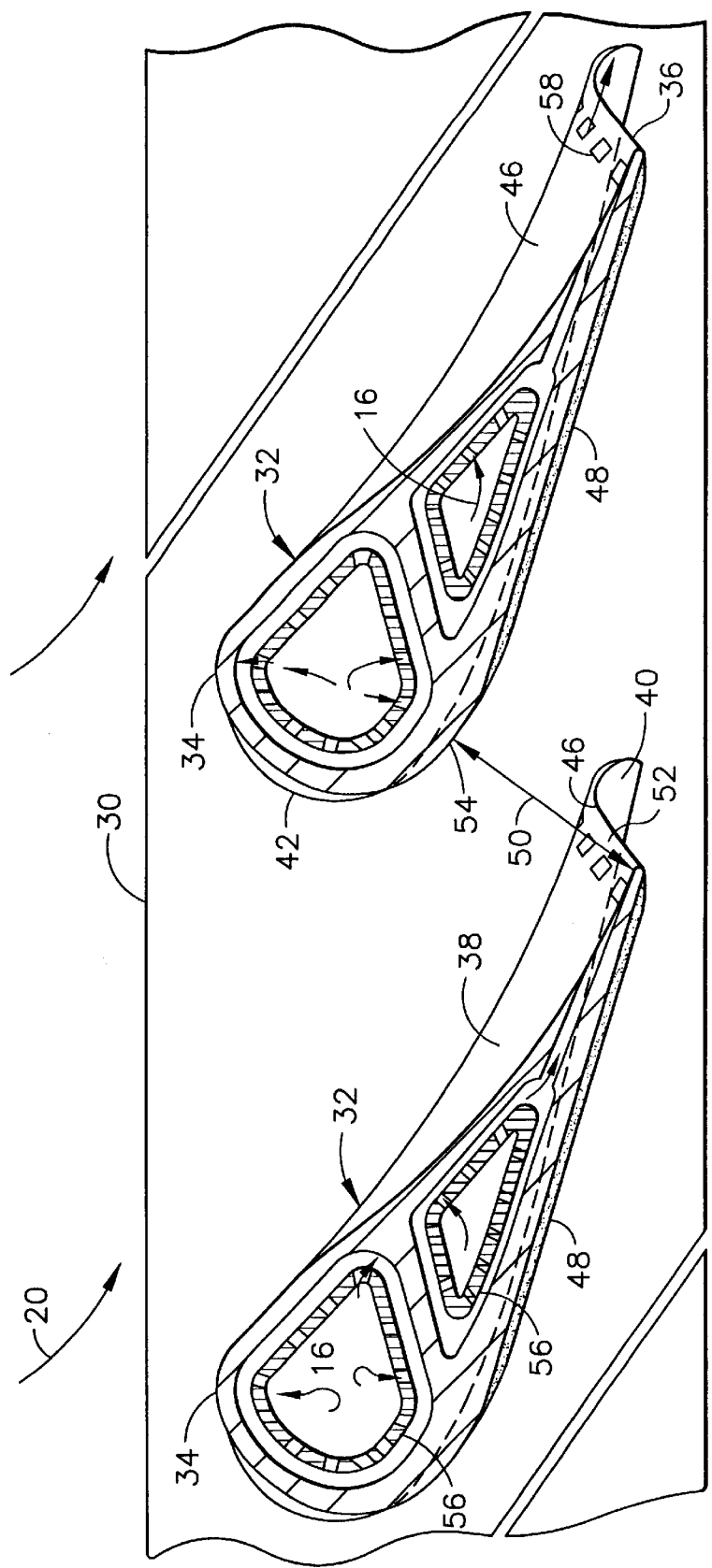
FIG. 4 is a top, sectional view through the nozzle segment illustrated in FIG. 2 and taken generally along line 4—4.

As shown best in FIGS. 3 and 4, each of the vanes also includes a bend or bow 46 which is most pronounced along the trailing edge 36 to increase total pressure in the combustion gases 20 adjacent the inner band 30 at the root 42 of the vanes. Typical nozzle vanes are straight, particularly along their trailing edges, and their radial span sections have two-dimensional (2-D) curvature for turning and accelerating the combustion gases between adjacent vanes. The resulting combustion gas flowfield is therefore controlled only in two dimensions at each of the span sections.

The introduction of the bow 46 in the vanes 32 adds a third control dimension to the gas flowfield which significantly improves the aerodynamic efficiency of the turbine, and therefore improves the efficiency of the entire engine.

However, since the bowed vanes are no longer straight, they substantially increase the complexity of the thermal performance of the vanes. Since the combustion gases are hot, thermal movement, which includes expansion and contraction, of the vanes during operation changes the geometry of the vanes and causes thermally induced stress and strain. The temperature distribution over the pressure and suction sides of each vane varies substantially during operation and introduces thermal gradients, and thermally induced stress and stress therefrom.

This type of bowed turbine nozzle vane has enjoyed limited success in commercial service in this country over several years. Such a vane has included full coverage thermal barrier coating (TBC) over its pressure and suction sides except for the suction side boundary of the vane throats. However, such experience in an actual aircraft engine environment has resulted in spallation of the TBC in the leading edge region of the vanes. This TBC spalling problem is undesirable since it reduces the durability of the HP nozzle and therefore limits its useful life in service.

Accordingly, the present invention is an improvement for reducing or eliminating the spallation problem by including a thermal barrier coating (TBC) 48 selectively disposed solely or only along the vane suction sides 40 between the leading and trailing edges.

As best shown in FIG. 4, adjacent ones of the vanes 32 are spaced apart circumferentially to define corresponding throats 50 of minimum flow area for the combustion gases to pass between the adjacent vanes. Each throat 50 has a first or pressure boundary 52 which extends along the pressure side 38 at the trailing edge 36, and a circumferentially opposite second or suction boundary 54 extending along the suction side 48 adjacent the leading edge 34 of the next adjacent one of the vanes.

The throat 50 between each pair of adjacent vanes 32 is thusly defined by the minimum distance therebetween at the trailing edge 36 of one of the vanes and a corresponding region on the adjacent, second vane aft of the leading edge thereof. The vane throats 50 define the aft ends of converging channels between adjacent vanes through which the combustion gases 20 are accelerated and turned circumferentially toward the rotor blades 26 in a conventional manner.

In accordance with the present invention, both the first and second throat boundaries 52,54 are devoid of thermal barrier coating. By eliminating the TBC from the vane pressure side 38 as shown in FIG. 4, both boundaries of the throat 50 are defined by the parent metal outer surface of the vanes, and for a given design, a slight increase in flow area of the throats 50 is effected which has the additional advantage of increasing the stall margin of the upstream compressor 14.

However, the increased 3-D complexity of the bowed vanes 32 nevertheless requires effective cooling to prevent unacceptable thermal gradients therein and corresponding stress, strain, and distortion therefrom.

More specifically, the vanes 32 illustrated in FIG. 4 are hollow and include one or more impingement baffles 56 therein for channelling a cooling air portion of the pressurized air 16 bled from the compressor 14 as illustrated schematically in FIG. 1. The impingement baffles 56 are conventional in configuration and operation, and include a pattern of impingement holes therein which direct the cooling air 16 through the baffles in impingement inside the vanes for impingement cooling both the pressure and suction sides thereof from the inside. The impingement baffles 56 provide effective cooling in the leading edge and mid-chord regions of the vanes, and the spent impingement air is then discharged from the vanes in the aft direction through a row of conventional trailing edge discharge holes 58 in a conventional manner.

A portion of the spent impingement air is also discharged through various rows of conventional film cooling holes (not shown) disposed on both the pressure and suction sides of the vane to provide additional vane cooling as also found in the commercially used 3-D bowed vanes.

The TBC 48 illustrated in FIG. 4 is selectively sized in thickness along the suction side 40 to reduce or minimize differential thermal movement, or expansion and contraction, between the pressure and suction sides at least adjacent the vane bow 46.

More specifically, the selectively disposed TBC cooperates with the internal impingement cooling of the vanes to control the vane suction side bulk temperature and temperature distributions to reduce or minimize the thermally induced stress, strain, and distortion of the vane bow 46. The suction side TBC 48 limits heating of the vane suction side and therefore controls the thermal expansion thereof which is generally matched to the thermal expansion of the uncoated pressure side 38 to minimize thermally induced strain therein and distortion along the trailing edge 36 which would otherwise adversely affect the flow area of the throat 50. Maintaining accurate throat area ensures maximum aerodynamic performance of the nozzle, and correspondingly prevents excessive thrust bearing loads.

The suction side TBC maintains the temperature of the underlying parent metal below the maximum limits thereof and reduces thermal gradients therein to prevent premature cracking of the suction side during extended use. And, eliminating the TBC in the leading edge regions of the vanes correspondingly eliminates spallation thereof.

As shown in FIG. 4, the vane bow 46 is radially convex between the outer and inner bands along the pressure side 38, and correspondingly radially concave along the suction side 40 with the TBC 48 thereon. The vanes therefore have compound curvature since the pressure side 38 is generally concave in the axial direction, with the bow 46 being convex in the radial direction, and the suction side 40 is generally convex in the axial direction, with the corresponding side of the bow 46 being concave in the radial direction.

The vane bow 46 preferably has maximum radial curvature at the trailing edge 36, and decreases in curvature toward the leading edge 34, and smoothly blends into the radially straight portion of the vane near its mid-chord region. The TBC 48 preferably decreases in thickness from the trailing edge 36 toward the second throat boundary 54 near the leading edge.

For example, the TBC 48 has a nominal maximum thickness of about 7 mils (0.18 mm), which remains substantially constant in the upstream direction from the trailing edge up to the location of the aft impingement baffle and then transitions in decreasing thickness toward the throat second boundary 54 to be completely eliminated thereat. This configuration provides maximum thermal protection of the vane over the majority of the vane bow 46. In this way, the TBC protects the suction side of each vane primarily over the full extent of the vane bow 46.

Since thermal barrier coating has been provided on the 3D vane in the past on the pressure side at a nominal thickness of 5 mils (0.125 mm) and on the suction sides at a nominal thickness of 10 mils (0.25 mm), the preferred reduction in nominal suction-side thickness from 10 to 7 mils accommodates the elimination of thermal barrier coating on the pressure side 38 for maintaining a thermal balance between the pressure and suction sides. This is particularly significant for the bowed vanes which have a greater tendency for thermally induced distortion.

More specifically, FIGS. 3 and 4 illustrate that the vane bow 46 is disposed nearer the inner band 30 than the outer band 28. As best shown in FIG. 4, each of the vanes 32 twists about the leading edge 34 from the inner band 30 to the outer band to define in part the vane bow 46.

Each of the vanes 32 preferably also leans in the tangential or circumferential direction along the trailing edge 36 to also define in part the vane bow 46. The combined twisting and leaning of the vanes 32 is sufficient for defining the individual bows 46.

In particular, each vane 32 may be defined by a plurality of radial or span sections from the root 42 to the tip 44 in a conventional manner. By twisting the adjacent span sections about the leading edge 34 from the root to the tip of the vane, and by leaning the trailing edge 36 from section to section, the vane bow 46 may be defined. Conventional finite element analytical software is available for designing the specific configuration of the individual vanes for a given engine application, and analyzing the aerodynamic performance thereof in three dimensions. In this way, the vane bow 46 may be configured in detail to increase momentum of the combustion gases 20 adjacent the inner band 30 for effecting the 3-D aerodynamic vane and its substantial increase in aerodynamic efficiency of the high pressure turbine and the engine.

Comparing the improved 3-D bowed nozzle vanes 32 to conventional 2-D nozzle vanes without vane bows and with substantially straight trailing edges results in significant differences in aerodynamic performance therebetween. A typical 2-D linear nozzle vane is generally straight along its trailing edge and is twisted thereabout to define the individual converging channels between the vanes. For a given engine design, a given flowrate of the combustion gases passes through the turbine nozzles. The 3-D bowed vanes 32 effect a substantially higher total pressure near the vane roots 42 as compared with the conventional 2-D vanes which results in a significant increase in gas flow momentum in this region. Correspondingly, the 3-D vane has a substantial reduction in swirl angle of the combustion gases 20 discharged along the trailing edge thereof as compared with the higher swirl angle from the 2-D vane.

Furthermore, gas flow streamlines in the blade roots downstream of the 2-D vanes are non-planar and twist over upon themselves. In contrast, the 3-D vane effects planar gas flow streamlines near the blade roots due to the additional radial affect of the vane bow 46 not otherwise available in the 2-D design.

As a result of these differences in the structure and performance, a significant increase in aerodynamic efficiency of the turbine nozzle and the engine is effected by the 3-D vanes. The improved, selective application of the TBC 48 on the suction side only of the 3-D vanes maintains the improved aerodynamic performance thereof; increases the stall margin of the compressor; eliminates the leading edge spallation problem; and enhances durability of the nozzle vanes with a corresponding useful low-cycle fatigue life thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by letters patent of the united states is the invention as defined and differentiated in the following claims:

1. A turbine nozzle comprising:

an outer band;

an inner band;

a plurality of vanes extending between said outer and inner bands;

each of said vanes including leading and trailing edges, and pressure and suction sides extending therebetween, and also including a bow along said trailing edge; and each of said vanes also including a thermal barrier coating selectively disposed along at least a portion of said suction side with said pressure side being devoid of said coating.

2. A nozzle according to claim 1 wherein:

adjacent ones of said vanes are spaced apart circumferentially to define a throat of minimal flow area therebetween having a first boundary along said pressure side at said trailing edge of one of said vanes, and a second boundary along said suction side adjacent said leading edge of a second one of said vanes; and both said first and second throat boundaries are devoid of said coating.

3. A nozzle according to claim 2 wherein:

said vanes are hollow and include impingement baffles therein for channelling cooling air in impingement inside said vanes for impingement cooling both said pressure and suction sides thereof; and said coating is sized in thickness along said suction side to reduce differential thermal movement between said pressure and suction sides adjacent said vane bow.

4. A nozzle according to claim 3 wherein said vane bow is radially convex between said outer and inner bands along said pressure side, and radially concave along said suction side having said coating thereon.

5. A nozzle according to claim 4 wherein:

said vane has maximum curvature at said trailing edge, and decreases in curvature toward said leading edge; and said coating decreases in thickness from said trailing edge toward said second throat boundary.

6. A nozzle according to claim 5 wherein said vane bow is disposed nearer said inner band than said outer band.

7. A nozzle according to claim 5 wherein each of said vanes twists about said leading edge from said inner band to said outer band to define said bow.

8. A nozzle according to claim 5 wherein each of said vanes leans along said trailing edge to define said bow.

9. A nozzle according to claim 5 wherein each of said vanes twists about said leading edge from said inner band to said outer band, and leans along said trailing edge to define said bow.

10. A nozzle according to claim 9 wherein said bow is configured to increase momentum of said combustion gases adjacent said inner band.

\* \* \* \* \*